United States Patent
Park et al.

(10) Patent No.: US 8,509,164 B2
(45) Date of Patent: Aug. 13, 2013

(54) METHOD FOR RE-ATTEMPTING A RANDOM ACCESS EFFECTIVELY

(75) Inventors: Sung-Jun Park, Gyeonggi-Do (KR);
Seung-June Yi, Gyeonggi-Do (KR);
Young-Dae Lee, Gyeonggi-Do (KR);
Sung-Duck Chun, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 570 days.

(21) Appl. No.: 12/668,199

(22) PCT Filed: Aug. 7, 2008

(86) PCT No.: PCT/KR2008/004604
§ 371 (c)(1),
(2), (4) Date: Jan. 14, 2010

(87) PCT Pub. No.: WO2009/022813
PCT Pub. Date: Feb. 19, 2009

(65) Prior Publication Data
US 2010/0142470 A1    Jun. 10, 2010

Related U.S. Application Data

(60) Provisional application No. 60/955,040, filed on Aug. 10, 2007.

(30) Foreign Application Priority Data

Aug. 6, 2008   (KR) .................. 10-2008-0077128

(51) Int. Cl.
*H04W 4/00*       (2009.01)
*H04B 7/00*       (2006.01)

(52) U.S. Cl.
USPC .......................... 370/329; 370/315; 455/509

(58) Field of Classification Search
USPC ................ 370/329, 315, 311, 252; 455/509, 455/450, 522
See application file for complete search history.

(56) References Cited

U.S. PATENT DOCUMENTS

| | | | |
|---|---|---|---|
| 6,445,917 B1 | 9/2002 | Bark et al. | |
| 6,594,240 B1 | 7/2003 | Chuah et al. | |
| 6,594,244 B1 | 7/2003 | Chang et al. | |
| 6,628,946 B1 | 9/2003 | Wiberg et al. | |

(Continued)

FOREIGN PATENT DOCUMENTS

| | | |
|---|---|---|
| CN | 1314747 | 9/2001 |
| CN | 1339903 | 3/2002 |

(Continued)

OTHER PUBLICATIONS

Nokia, "Buffer Reporting for E-UTRAN," R2-060829, 3GPP TSG-RAN WG2 Meeting #52, Mar. 2006, XP-002503218.

(Continued)

*Primary Examiner* — Afshawn Towfighi
(74) *Attorney, Agent, or Firm* — Lee, Hong, Degerman, Kang & Waimey

(57) ABSTRACT

Disclosed is a radio (wireless) communication system providing a radio communication service and the terminal, and more particularly, to a method for re-attempting a rapid random access when a problem occurs in the random access procedure in an Evolved Universal Mobile Telecommunications System (E-UMTS) evolved from the Universal Mobile Telecommunications System (UMTS) or a Long Term Evolution (LTE) system.

12 Claims, 3 Drawing Sheets

(56) References Cited

U.S. PATENT DOCUMENTS

| | | |
|---|---|---|
| 6,728,918 B1 | 4/2004 | Ikeda et al. |
| 6,862,450 B2 | 3/2005 | Mikola et al. |
| 7,171,163 B2 | 1/2007 | Terry et al. |
| 7,227,868 B2 | 6/2007 | Inden |
| 7,313,116 B2 | 12/2007 | Lee et al. |
| 7,400,593 B2 | 7/2008 | Choi et al. |
| 7,450,933 B2 | 11/2008 | Kwak et al. |
| 7,486,699 B2 | 2/2009 | Yi et al. |
| 7,525,908 B2 | 4/2009 | Olsson et al. |
| 7,706,410 B2 | 4/2010 | Chun et al. |
| 7,710,930 B2 | 5/2010 | Kwak |
| 7,817,595 B2 | 10/2010 | Wu |
| 7,876,771 B2 | 1/2011 | Bergstrom et al. |
| 7,894,444 B2 | 2/2011 | Lohr et al. |
| 7,978,616 B2 | 7/2011 | Chun et al. |
| 8,027,363 B2 | 9/2011 | Chun et al. |
| 8,031,689 B2 | 10/2011 | Guo |
| 8,059,597 B2 | 11/2011 | Park et al. |
| 8,081,662 B2 | 12/2011 | Chun et al. |
| 8,130,687 B2 | 3/2012 | Cai et al. |
| 8,160,012 B2 | 4/2012 | Chun et al. |
| 8,190,144 B2 | 5/2012 | Chun et al. |
| 8,203,988 B2 | 6/2012 | Chun et al. |
| 8,243,931 B2 | 8/2012 | Yi et al. |
| 8,270,348 B2 | 9/2012 | Chun et al. |
| 2002/0024972 A1 | 2/2002 | Yi et al. |
| 2002/0114280 A1 | 8/2002 | Yi et al. |
| 2002/0122411 A1 | 9/2002 | Zimmerman et al. |
| 2003/0099305 A1 | 5/2003 | Yi et al. |
| 2004/0008659 A1 | 1/2004 | Kim |
| 2004/0076182 A1 | 4/2004 | Wu |
| 2004/0103435 A1 | 5/2004 | Yi et al. |
| 2004/0117860 A1 | 6/2004 | Yi et al. |
| 2004/0146019 A1 | 7/2004 | Kim et al. |
| 2004/0148396 A1 | 7/2004 | Meyer et al. |
| 2004/0153852 A1 | 8/2004 | Wu |
| 2004/0156330 A1 | 8/2004 | Yi et al. |
| 2004/0184438 A1 | 9/2004 | Terry |
| 2004/0208160 A1 | 10/2004 | Petrovic et al. |
| 2004/0223507 A1 | 11/2004 | Kuchibhotla et al. |
| 2004/0229626 A1 | 11/2004 | Yi et al. |
| 2005/0026597 A1 | 2/2005 | Kim et al. |
| 2005/0039101 A1 | 2/2005 | Torsner |
| 2005/0041663 A1 | 2/2005 | Jiang |
| 2005/0041681 A1 | 2/2005 | Lee et al. |
| 2005/0042987 A1 | 2/2005 | Lee et al. |
| 2005/0047416 A1 | 3/2005 | Heo et al. |
| 2005/0063347 A1 | 3/2005 | Sarkkinen et al. |
| 2005/0083943 A1 | 4/2005 | Lee et al. |
| 2005/0096017 A1 | 5/2005 | Kim |
| 2005/0100048 A1 | 5/2005 | Chun et al. |
| 2005/0105499 A1 | 5/2005 | Shinozaki et al. |
| 2005/0118992 A1 | 6/2005 | Jeong et al. |
| 2005/0147040 A1 | 7/2005 | Vayanos et al. |
| 2005/0164683 A1 | 7/2005 | Roberts et al. |
| 2005/0169293 A1 | 8/2005 | Zhang et al. |
| 2005/0192021 A1 | 9/2005 | Lee et al. |
| 2005/0193309 A1 | 9/2005 | Grilli et al. |
| 2005/0201354 A1 | 9/2005 | Hosaka et al. |
| 2005/0213605 A1 | 9/2005 | Kim et al. |
| 2005/0237932 A1 | 10/2005 | Liu |
| 2005/0237960 A1 | 10/2005 | Kim |
| 2005/0238051 A1 | 10/2005 | Yi et al. |
| 2005/0249141 A1 | 11/2005 | Lee et al. |
| 2005/0254467 A1 | 11/2005 | Li et al. |
| 2005/0259662 A1 | 11/2005 | Kim et al. |
| 2005/0286483 A1 | 12/2005 | Lee et al. |
| 2006/0007886 A1 | 1/2006 | Lee et al. |
| 2006/0030342 A1 | 2/2006 | Hwang et al. |
| 2006/0056441 A1 | 3/2006 | Jiang |
| 2006/0067238 A1 | 3/2006 | Olsson et al. |
| 2006/0067364 A1 | 3/2006 | Jung et al. |
| 2006/0072503 A1 | 4/2006 | Kim et al. |
| 2006/0092972 A1 | 5/2006 | Petrovic et al. |
| 2006/0098574 A1 | 5/2006 | Yi et al. |
| 2006/0128312 A1 | 6/2006 | Declerck et al. |
| 2006/0142020 A1 | 6/2006 | Mueckenheim et al. |
| 2006/0154603 A1 | 7/2006 | Sachs et al. |
| 2006/0154680 A1 | 7/2006 | Kroth et al. |
| 2006/0165045 A1 | 7/2006 | Kim et al. |
| 2006/0182065 A1 | 8/2006 | Petrovic et al. |
| 2006/0203780 A1 | 9/2006 | Terry |
| 2006/0233200 A1 | 10/2006 | Fifield et al. |
| 2006/0251027 A1 | 11/2006 | Chun et al. |
| 2006/0251105 A1 | 11/2006 | Kim et al. |
| 2006/0264179 A1 | 11/2006 | Bonneville et al. |
| 2006/0274690 A1 | 12/2006 | Chun et al. |
| 2006/0280145 A1 | 12/2006 | Revel et al. |
| 2006/0281456 A1 | 12/2006 | Roberts et al. |
| 2007/0041397 A1 | 2/2007 | Hwang |
| 2007/0047452 A1 | 3/2007 | Lohr et al. |
| 2007/0047493 A1 | 3/2007 | Park et al. |
| 2007/0053309 A1 | 3/2007 | Poojary et al. |
| 2007/0079207 A1 | 4/2007 | Seidel et al. |
| 2007/0081513 A1 | 4/2007 | Torsner |
| 2007/0091810 A1 | 4/2007 | Kim et al. |
| 2007/0097913 A1 | 5/2007 | Hanov |
| 2007/0117579 A1 | 5/2007 | Cai et al. |
| 2007/0178878 A1 | 8/2007 | Ding |
| 2007/0183358 A1 | 8/2007 | Cai |
| 2007/0189205 A1 | 8/2007 | Terry et al. |
| 2007/0201397 A1 | 8/2007 | Zhang |
| 2007/0206530 A1 | 9/2007 | Lee et al. |
| 2007/0223526 A1* | 9/2007 | Jiang .......................... 370/468 |
| 2007/0258591 A1 | 11/2007 | Terry et al. |
| 2007/0274278 A1 | 11/2007 | Choi et al. |
| 2007/0297360 A1 | 12/2007 | Joachim et al. |
| 2007/0297367 A1 | 12/2007 | Wang et al. |
| 2008/0008152 A1 | 1/2008 | Lohr et al. |
| 2008/0043658 A1 | 2/2008 | Worrall |
| 2008/0045224 A1 | 2/2008 | Lu et al. |
| 2008/0049682 A1 | 2/2008 | Ding et al. |
| 2008/0051098 A1 | 2/2008 | Rao |
| 2008/0059859 A1 | 3/2008 | Marinier et al. |
| 2008/0069108 A1 | 3/2008 | Yi et al. |
| 2008/0084851 A1 | 4/2008 | Kim et al. |
| 2008/0089285 A1 | 4/2008 | Pirskanen et al. |
| 2008/0101609 A1 | 5/2008 | Jiang |
| 2008/0165717 A1 | 7/2008 | Chen et al. |
| 2008/0165755 A1 | 7/2008 | Marinier et al. |
| 2008/0182609 A1 | 7/2008 | Somasundaram et al. |
| 2008/0186944 A1 | 8/2008 | Suzuki et al. |
| 2008/0186946 A1 | 8/2008 | Marinier et al. |
| 2008/0198869 A1 | 8/2008 | Jiang |
| 2008/0212561 A1 | 9/2008 | Pani et al. |
| 2008/0212605 A1 | 9/2008 | Jiang |
| 2008/0232396 A1 | 9/2008 | Buckley et al. |
| 2008/0233940 A1 | 9/2008 | Jen |
| 2008/0233941 A1 | 9/2008 | Jen |
| 2008/0261581 A1 | 10/2008 | Cai |
| 2008/0268878 A1 | 10/2008 | Wang et al. |
| 2008/0273482 A1 | 11/2008 | Lee et al. |
| 2008/0273610 A1 | 11/2008 | Malladi et al. |
| 2008/0318566 A1 | 12/2008 | Chun et al. |
| 2008/0318578 A1 | 12/2008 | Worrall |
| 2009/0005058 A1 | 1/2009 | Kazmi et al. |
| 2009/0016301 A1 | 1/2009 | Sammour et al. |
| 2009/0041240 A1 | 2/2009 | Parkvall et al. |
| 2009/0046631 A1 | 2/2009 | Meylan et al. |
| 2009/0046695 A1 | 2/2009 | Jiang |
| 2009/0104890 A1 | 4/2009 | Wang et al. |
| 2009/0116434 A1 | 5/2009 | Lohr et al. |
| 2009/0119564 A1 | 5/2009 | Sagfors et al. |
| 2009/0156194 A1 | 6/2009 | Meylan |
| 2009/0175163 A1 | 7/2009 | Sammour et al. |
| 2009/0175253 A1 | 7/2009 | Wu et al. |
| 2009/0190480 A1 | 7/2009 | Sammour et al. |
| 2009/0232076 A1* | 9/2009 | Kuo .......................... 370/329 |
| 2009/0259908 A1 | 10/2009 | Gollapudi |
| 2009/0305712 A1 | 12/2009 | Franceschini et al. |
| 2010/0014466 A1 | 1/2010 | Meyer et al. |
| 2010/0091750 A1 | 4/2010 | Lee et al. |
| 2010/0128648 A1 | 5/2010 | Lee et al. |
| 2010/0142429 A1 | 6/2010 | Yi et al. |

| | | |
|---|---|---|
| 2010/0157904 A1 | 6/2010 | Ho et al. |
| 2010/0232335 A1 | 9/2010 | Lee et al. |
| 2010/0260140 A1 | 10/2010 | Zhu |
| 2011/0019604 A1 | 1/2011 | Chun et al. |
| 2011/0033048 A1 | 2/2011 | Stanwood et al. |
| 2011/0149865 A1 | 6/2011 | Lee et al. |

FOREIGN PATENT DOCUMENTS

| | | |
|---|---|---|
| CN | 1396780 | 2/2003 |
| CN | 1549610 | 11/2004 |
| CN | 1613210 | 5/2005 |
| CN | 1642067 | 7/2005 |
| CN | 1761260 | 4/2006 |
| CN | 1761356 | 4/2006 |
| CN | 1792048 | 6/2006 |
| CN | 1846365 | 10/2006 |
| CN | 1868157 | 11/2006 |
| CN | 1918825 | 2/2007 |
| CN | 1938969 | 3/2007 |
| CN | 1954521 | 4/2007 |
| CN | 101047966 | 10/2007 |
| CN | 101090281 | 12/2007 |
| CN | 101690375 | 9/2012 |
| EP | 1263160 | 12/2002 |
| EP | 1326397 | 7/2003 |
| EP | 1509011 | 2/2005 |
| EP | 1638237 | 3/2006 |
| EP | 1768297 | 3/2007 |
| EP | 2026523 | 2/2009 |
| EP | 2163006 | 3/2012 |
| JP | 1995162948 | 6/1995 |
| JP | 2000-324161 | 11/2000 |
| JP | 2001-197021 | 7/2001 |
| JP | 2001197021 | 7/2001 |
| JP | 2002198895 | 7/2002 |
| JP | 2003-018050 | 1/2003 |
| JP | 2003-115796 | 4/2003 |
| JP | 2003115876 | 4/2003 |
| JP | 2003516021 | 5/2003 |
| JP | 2003229925 | 8/2003 |
| JP | 2003-283592 | 10/2003 |
| JP | 2005-073276 | 3/2005 |
| JP | 2006-054718 | 2/2006 |
| JP | 2006-505209 | 2/2006 |
| JP | 2006505209 | 2/2006 |
| JP | 2006-514466 | 4/2006 |
| JP | 2006-121562 | 5/2006 |
| JP | 2006311543 | 11/2006 |
| JP | 2007116639 | 5/2007 |
| JP | 2007312244 | 11/2007 |
| JP | 2008-520125 | 6/2008 |
| JP | 2009-513058 | 3/2009 |
| JP | 2009521893 | 6/2009 |
| KR | 10-2001-0045783 | 6/2001 |
| KR | 2003-0060055 | 7/2003 |
| KR | 1020030087914 | 11/2003 |
| KR | 10-2004-0034398 | 4/2004 |
| KR | 10-2004-0072961 | 8/2004 |
| KR | 10-2005-0081836 | 8/2005 |
| KR | 10-2005-0092874 A | 9/2005 |
| KR | 10-2005-0099472 | 10/2005 |
| KR | 10-2005-0103127 | 10/2005 |
| KR | 1020050103127 | 10/2005 |
| KR | 1020060004935 | 1/2006 |
| KR | 10-2006-0014910 | 2/2006 |
| KR | 10-2006-0029452 | 4/2006 |
| KR | 10-2006-0090191 | 8/2006 |
| KR | 10-2007-0076374 | 7/2007 |
| KR | 10-0907978 | 7/2009 |
| KR | 10-2009-0084756 | 8/2009 |
| RU | 2304348 | 8/2007 |
| TW | 496058 | 7/2002 |
| WO | 0137473 | 5/2001 |
| WO | 2004/042963 | 5/2004 |
| WO | 2004042953 | 5/2004 |
| WO | 2004/102838 | 11/2004 |
| WO | 2005/078967 | 8/2005 |
| WO | 2005/079105 | 8/2005 |
| WO | 2005/109671 | 11/2005 |
| WO | 2005122441 | 12/2005 |
| WO | 2006009714 | 1/2006 |
| WO | 2006/016785 | 2/2006 |
| WO | 2006/033521 | 3/2006 |
| WO | 2006/052086 | 5/2006 |
| WO | 2006083149 | 8/2006 |
| WO | 2006/095385 | 9/2006 |
| WO | 2006/104335 | 10/2006 |
| WO | 2006/104342 | 10/2006 |
| WO | 2006/116620 | 11/2006 |
| WO | 2006/118435 | 11/2006 |
| WO | 2006118418 | 11/2006 |
| WO | 2007/020070 | 2/2007 |
| WO | 2007/023364 | 3/2007 |
| WO | 2007/045505 | 4/2007 |
| WO | 2007/052921 | 5/2007 |
| WO | 2007/066900 A1 | 6/2007 |
| WO | 2007/078142 A1 | 7/2007 |
| WO | 2007/078155 | 7/2007 |
| WO | 2007/078174 | 7/2007 |
| WO | 2007/079085 | 7/2007 |
| WO | 07078156 | 7/2007 |
| WO | 2007/091831 | 8/2007 |
| WO | 2007147431 | 12/2007 |
| WO | 2008/010063 | 1/2008 |
| WO | 2008004725 | 1/2008 |
| WO | 2008/094120 | 8/2008 |
| WO | 2009/035301 | 3/2009 |

OTHER PUBLICATIONS

Nokia, "Uplink Scheduling for VoIP," R2-070476, 3GPP TSG-RAN WG2 Meeting #57, Feb. 2007, XP-008125208.

NTT DoCoMo et al., "Scheduling Request Transmission Method for E-UTRA Uplink," R1-063301, 3GPP TSG RAN WG1 Meeting #47, Nov. 2006.

Motorola, "Synchronized Random Access Channel and Scheduling Request," R1-063046, 3GPP TSG RAN1#47, Nov. 2006.

Ericsson, "Basic Principles for the Scheduling Request in LTE," R2-062350, 3GPP TSG RAN WG2 #54, Aug. 2006.

Ericsson et al., "Framework for Scheduling Request and Buffer Status Reporting," R2-074691, TSG-RAN WG2 Meeting #60, Nov. 2007.

LG Electronics Inc., "Correction to Polling Procedure", R2-081588, 3GPP TSG-RAN WG2 #61 bis, Mar. 2008.

"Universal Mobile Telecommunications System (UMTS); Radio Link Control (RLC) protocol specification (3GPP TS 25.322 version 4.10.0 Release 4)", ETSI TS 125 322 V4.10.0, Sep. 2003, XP-014016803.

Cohen, "An Improved SSCOP-like Scheme for Avoiding Unnecessary Retransmissions and Achieving Ideal Throughput," Proceedings of IEEE Infocom Conference on Computer Communications, pp. 855-862, Mar. 1996, XP-010158150.

Wang, P.S., et al., "Operation of Control Protocol Data Units in Packet Data Convergence Protocol", U.S. Appl. No. 60/976,139, Sep. 28, 2007.

Mukherjee, R.P., et al., "Method and Apparatus of Performing Packet Data Convergence Protocol Reset", U.S. Appl. No. 61/019,058, Jan. 4, 2008.

NEC, "Considerations on Scheduling Information", R2-073556, 3GPP TSG-RAN WG2#59, Aug. 2007.

Itri, "Buffer Status Reporting with Group Combining for LTE", R2-072833, 3GPP TSG-RAN-WG2 Meeting #58bis, Jun. 2007.

ASUSTeK, "On-line recovery of HFN synchronization due to RLC UM SN problem", R2-041940, 3GPP TSG-RAN WG2 meeting #44, Oct. 2004.

Rapporteur (ASUSTeK), "Summary of HFN de-synchronization problem off-line email discussion", R2-050318, 3GPP TSG RAN WG2 #46, Feb. 2005.

3rd Generation Partnership Project; "Technical Specification Group Radio Access Network; Medium Access Control (MAC) protocol specification (Release 7)", 3GPP TS 25.321, V7.5.0, Jun. 2007.

3rd Generation Partnership Project; "Technical Specification Group Radio Access Network; Evolved Universal Terrestrial Radio Access (E-UTRA) Medium Access Control (MAC) protocol specification (Release 8)", 3GPP TS 36.321, V1.0.0, Sep. 2007.
Qualcomm Europe, "Scheduling request mechanism", R1-071276, 3GPP TSG-RAN WG1 #48bis, Mar. 2007.
Texas Instruments, "Scheduling Request and DRX in E-UTRA", R1-072859, 3GPP TSG RAN WG1 #49bis, Jun. 2007.
Ericsson, "SDU Discard", R2-073230, 3GPP TSG-RAN WG2 #59, Aug. 2007.
Nokia Siemens Networks, "Update on Security, System Information, Mobility, MBMS and DRX", R2-073863, 3GPP TSG-RAN2 Meeting #59, Jun. 2007.
NTT DoCoMo, Inc. et al., "MAC PDU structure for LTE", R2-074174, 3GPP TSG RAN WG2 #59bis, Oct. 2007.
Motorola, "MAC Header format", R2-074419, 3GPP TSG-RAN2 Meeting #59bis, Oct. 2007.
Kashima, T., "Method and Apparatus for Providing Timing Alignment", U.S. Appl. No. 60/944,662, Jun. 18, 2007.
Lin, L.C., "Enhanced Random Access Response Formats in E-UTRA", U.S. Appl. No. 61/006,348, Jan. 8, 2008.
Ericsson, "Scheduling Request in E-UTRAN," 3GPP TSG-RAN #47bis, R1-070471, Jan. 2007.
Qualcomm Europe, "Further Details on RACH Procedure," 3GPP TSG-RAN WG1 #48, R1-070649, Feb. 2007.
NTT DoCoMo, Inc., "Buffer Status Report and Scheduling Request triggers," 3GPP TSG-RAN WG2 #59, R2-073574, Aug. 2007.
LG Electronics Inc., "Correction of status reporting coding," 3GPP TSG RAN WG2 #61, R2-080969, Feb. 2008, pp. 1-3, XP-002624626.
Alcatel-Lucent, "PDCP status report carrying LIS only," 3GPP TSG RAN WG2 #61, R2-080902, Jan. 2008, XP-050138711.
3rd Generation Partnership Project (3GPP), "Technical Specification Group Radio Access Network; Evolved Universal Terrestrial Radio Access (E-UTRA); Packet Data Convergence Protocol (PDCP) specification (Release 8)," 3GPP TS 36.323, V8.2.1, May 2008, pp. 1-25, XP-050377638.
LG Electronics, "Correction to PDCP Status Report," 3GPP TSG RAN WG2 #61bis, R2-081594, Mar. 2008, pp. 1-8, XP-002624627.
Amitava Ghosh et al., "Random Access Design for UMTS Air-Interface Evolution", pp. 1041-1045, Apr. 2007.
Zte, "Redundant Retransmission Restraint in RLC-AM," R2-061234, 3GPP TSG RAN WG2 Meeting #53, May 2006, XP-050131180.
European Telecommunications Standards Institute (ETSI), "Digital Cellular Telecommunications System (Phase 2+); Functional Stage 2 Description of Location Services (LCS) in GERAN (Release 7)," ETSI TS 143 059, v7.3.0, May 2007, XP-014038519.
3rd Generation Partnership Project, "Technical Specification Group Radio Access Network; Evolved Universal Terrestrial Radio Access (E-UTRA) Radio Link Control (RLC) protocol specification (Release 8)", 3GPP TS 36.322, V8.0.0, Dec. 2007.
NTT DoCoMo Inc "Miscellaneous corrections to TS 36.322", 3GPP TSG-RAN2 Meeting #61bis, R2-081700, Mar. 2008.
Ericsson, "Clarification to the handling of large RLC status reports", 3GPP TSG-RAN2 Meeting #61bis, R2-082018, Mar. 2008.
LG Electronics, et al., "ACK_SN setting for short STATUS PDU", 3GPP TSG-RAN WG2 #62, R2-082133, May 2008.
LG Electronics Inc., "UE State Transition in LTE_ACTIVE," R2-061002, 3GPP TSG-RAN WG2 #52, Mar. 2006, XP-050130928.
Texas Instruments, "UL Synchronization Management and Maintenance in E-UTRA," R1-072198, 3GPP TSG RAN WG1 #49, May 2007, XP-050105936.
Texas Instruments, "UL Synchronization Management in LTE_ACTIVE," R1-071478, 3GPP TSG RAN WG1 #48bis, Mar. 2007, XP-050105413.
Motorola, "Contention-free Intra-LTE Handover," R2-070730, 3GPP TSG-RAN WG2 #57, Feb. 2007, XP-050133763.
Ericsson, "Scheduling Request in E-UTRAN," R1-070471, 3GPP TSG-RAN WG2 #47bis, Jan. 2007, XP-050104502.
United States Patent and Trademark Office U.S. Appl. No. 13/441,698, Office Action dated Nov. 21, 2012, 31 pages.
United States Patent and Trademark Office U.S. Appl. No. 12/738,625, Office Action dated Oct. 24, 2012, 103 pages.

State Intellectual Property Office of the People's Republic of China Application Serial No. 200980109358.5, Office Action dated Nov. 26, 2012, 6 pages.
LG Electronics, "Update of EUTAN PDCP Specification", R2-081390, 3GPP TSG-RAN2 Meeting #61, Jan. 2008.
ASUSTeK Computer Inc., "HFN de-synchronization detection with Integrity Protection scheme in a wireless communications system", U.S. Appl. No. 60/863,800.
Alcatel-Lucent, "Format for RACH Message 2", R2-080176, 3GPP TSG RAN WG2 #60bis, Jan. 2008.
Motorola, "Design of backoff scheme for LTE", R2-070143, 3GPP TSG-RAN WG2 Meeting #56bis, Jan. 2007.
MAC Rapporteurs (Ericsson, Qualcomm Europe), "E-UTRA MAC protocol specification update", R2-080631, 3GPP TSG-RAN2 Meeting #60bis, Jan. 2008.
NTT DoCoMo, Inc., "Uplink synchronization maintenance", R2-072014, 3GPP TSG RAN WG2 #58, May 2007, 4 pages, XP50134889.
European Patent Office Application Serial No. 08766423.1, Office Action dated Nov. 5, 2012, 5 pages.
United States Patent and Trademark Office U.S. Appl. No. 12/452,905, Office Action dated Dec. 3, 2012, 13 pages.
United States Patent and Trademark Office U.S. Appl. No. 12/922,538, Office Action dated Nov. 23, 2012, 12 pages.
United States Patent and Trademark Office U.S. Appl. No. 12/452,733, Final Office Action dated Jan. 8, 2013, 19 pages.
Catt, "Notification scheme for system information Change", R2-071870, 3GPP TSG-RAN WG2#58, May 2007, 5 pages.
LG Electronics Inc., "Discussion on BCCH Update", R2-072736, 3GPP TSG-RAN WG2 #58bis, Jun. 2007, 3 pages.
European Patent Office Application Serial No. 08011263.4, Search Report dated Dec. 7, 2012, 8 pages.
United States Patent and Trademark Office U.S. Appl. No. 13/107,232, Notice of Allowance dated Jan. 30, 2013, 17 pages.
National Office of Intellectual Property of Vietnam Application Serial No. 1-2010-00246, Office Action dated Jan. 25, 2013, 2 pages.
United States Patent and Trademark Office U.S. Appl. No. 12/671,020, Notice of Allowance dated Feb. 14, 2013, 13 pages.
United States Patent and Trademark Office U.S. Appl. No. 13/107,329, Office Action dated Feb. 15, 2013, 10 pages.
The State Intellectual Property Office of the People's Republic of China Application Serial No. 200980100119.3, Office Action dated Feb. 5, 2013, 14 pages.
National Office of Intellectual Property of Vietnam Application No. 1-2010-00247, Office Action dated Feb. 26, 2013, 1 page.
National Office of Intellectual Property of Vietnam Application No. 1-2010-00637, Notice of Allowance dated Mar. 28, 2013, 1 page.
United States Patent and Trademark Office U.S. Appl. No. 12/452,905, Final Office Action dated Apr. 11, 2013, 20 pages.
3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321 V8.2.0, May 2008, 33 pages.
ASUSTeK, "Minor corrections to 36.321," 3GPP TSG-RAN WG2 Meeting #67, R2-095152, Aug. 2009, 6 pages.
United States Patent and Trademark Office U.S. Appl. No. 12/733,179, Final Office Action dated Apr. 18, 2013, 21 pages.
Ericsson, "RLC status report format", R2-074701, TSG-RAN WG2 Meeting #60, Nov. 2007.
3rd Generation Partnership Project (3GPP); "Technical Specification Group Radio Access Network; Evolved Universal Terrestrial Radio Access (E-UTRA) Medium Access Control (MAC) protocol specification (Release 8)", 3GPP TS 36.321 V1.0.0, Sep. 2007.
3rd Generation Partnership Project (3GPP); "Technical Specification Group Radio Access Network; Medium Access Control (MAC) protocol specification (Release 7)", 3GPP TS 25.321 V7.5.0, Jun. 2007.
Chairman, "LTE User Plane session report", R2-074536, 3GPP TSG RAN WG2 #59bis, Oct. 2008.
Qualcomm Europe, "General Corrections to RLC," 3GPP TSG-RAN Working Group 2 #22, Tdoc R2-011701, Jul. 2001, 12 pages.
LG Electronics Inc., "Out-of-sequence problem in AM RLC: Discretely discarded SDUs," 3GPP TSG-RAN WG2 Meeting #21, R2-011206, May 2001, 2 pages.

Japan Patent Office Application Serial No. 2012-151205, Office Action dated Apr. 16, 2013, 2 pages.
The State Intellectual Property Office of the People's Republic of China Application Serial No. 200880021003.6, Certificate dated Apr. 3, 2013, 15 pages.

United States Patent and Trademark Office U.S. Appl. No. 12/672,835, Final Office Action dated May 9, 2013, 16 pages.

* cited by examiner

METHOD FOR RE-ATTEMPTING A RANDOM ACCESS EFFECTIVELY

CROSS-REFERENCE TO RELATED APPLICATIONS

This application is the National Stage filing under 35 U.S.C. §371 of International Application No. PCT/KR2008/004604, filed on Aug. 7, 2008, which claims the benefit of earlier filing date and right of priority to Korean Application No. 10-2008-0077128, filed on Aug. 6, 2008, and also claims the benefit of U.S. Provisional Application Ser. No. 60/955,040, filed on Aug. 10, 2007.

TECHNICAL FIELD

The present invention relates to a radio (wireless) communication system providing a radio communication service and a terminal, and more particularly, to a method for determining, by a terminal, a transmission error during a random access procedure and re-attempting a rapid random access when a problem occurs during the random access procedure between the terminal (User Equipment; UE) and a network (or a base station (eNB)) in an Evolved Universal Mobile Telecommunications System (E-UMTS) or a Long Term Evolution (LTE) system.

BACKGROUND ART

FIG. 1 shows an exemplary network structure of an Evolved Universal Mobile Telecommunications System (E-UMTS) as a mobile communication system to which a related art and the present invention are applied. The E-UMTS system is a system that has evolved from the existing UMTS system, and its standardization work is currently being performed by the 3GPP standards organization. The E-UMTS system can also be referred to as a LTE (Long-Term Evolution) system.

The E-UMTS network can roughly be divided into an E-UTRAN and a Core Network (CN). The E-UTRAN generally comprises a terminal (i.e., User Equipment (UE)), a base station (i.e., eNode B), an Access Gateway (AG) that is located at an end of the E-UMTS network and connects with one or more external networks. The AG may be divided into a part for processing user traffic and a part for handling control traffic. Here, an AG for processing new user traffic and an AG for processing control traffic can be communicated with each other by using a new interface. One eNode B may have one or more cells. An interface for transmitting the user traffic or the control traffic may be used among the eNode Bs. The CN may comprise an AG, nodes for user registration of other UEs, and the like. An interface may be used to distinguish the E-UTRAN and the CN from each other.

The various layers of the radio interface protocol between the mobile terminal and the network may be divided into a layer 1 (L1), a layer 2 (L2) and a layer 3 (L3), based upon the lower three layers of the Open System Interconnection (OSI) standard model that is well-known in the field of communications systems. Among these layers, Layer 1 (L1), namely, the physical layer, provides an information transfer service to an upper layer by using a physical channel, while a Radio Resource Control (RRC) layer located in the lowermost portion of the Layer 3 (L3) performs the function of controlling radio resources between the terminal and the network. To do so, the RRC layer exchanges RRC messages between the terminal and the network. The RRC layer may be located by being distributed in network nodes such as the eNode B, the AG, and the like, or may be located only in the eNode B or the AG.

FIG. 2 shows an exemplary control plane architecture of a radio interface protocol between a terminal and a UTRAN (UMTS Terrestrial Radio Access Network) according to the 3GPP radio access network standard. The radio interface protocol as shown in FIG. 2 is horizontally comprised of a physical layer, a data link layer, and a network layer, and vertically comprised of a user plane for transmitting user data and a control plane for transferring control signaling. The protocol layer in FIG. 2 may be divided into L1(Layer 1), L2(Layer 2), and L3(Layer 2) based upon the lower three layers of the Open System Interconnection (OSI) standards model that is widely known in the field of communication systems.

Hereinafter, particular layers of the radio protocol control plane of FIG. 2 and of the radio protocol user plane of FIG. 3 will be described below.

The physical layer (Layer 1) uses a physical channel to provide an information transfer service to a higher layer. The physical layer is connected with a medium access control (MAC) layer located thereabove via a transport channel, and data is transferred between the physical layer and the MAC layer via the transport channel. Also, between respectively different physical layers, namely, between the respective physical layers of the transmitting side (transmitter) and the receiving side (receiver), data is transferred via a physical channel.

The Medium Access Control (MAC) layer of Layer 2 provides services to a radio link control (RLC) layer (which is a higher layer) via a logical channel. The RLC layer of Layer 2 supports the transmission of data with reliability. It should be noted that if the RLC functions are implemented in and performed by the MAC layer, the RLC layer itself may not need to exist. The PDCP layer of Layer 2 performs a header compression function that reduces unnecessary control information such that data being transmitted by employing Internet Protocol (IP) packets, such as IPv4 or IPv6, can be efficiently sent over a radio interface that has a relatively small bandwidth.

The Radio Resource Control (RRC) layer located at the lowermost portion of Layer 2 is only defined in the control plane, and handles the control of logical channels, transport channels, and physical channels with respect to the configuration, reconfiguration and release of radio bearers (RB). Here, the RB refers to a service that is provided by Layer 2 for data transfer between the mobile terminal and the UTRAN.

As for channels used in downlink transmission for transmitting data from the network to the mobile terminal, there is a Broadcast Channel (BCH) used for transmitting system information, and a downlink Shared Channel (SCH) used for transmitting user traffic or control messages. A downlink multicast, traffic of broadcast service or control messages may be transmitted via the downlink SCH or via a separate downlink Multicast Channel (MCH). As for channels used in uplink transmission for transmitting data from the mobile terminal to the network, there is a Random Access Channel (RACH) used for transmitting an initial control message, and an uplink Shared Channel (SCH) used for transmitting user traffic or control messages.

As for downlink physical channels for transmitting information transferred via the channels used in downlink transmission over a radio interface between the network and the terminal, there is a Physical Broadcast Channel (PBCH) for transmitting BCH information, a Physical Multicast Channel (PMCH) for transmitting MCH information, a Physical Downlink Shared Channel (PDSCH) for transmitting PCH and a downlink SCH information, and a Physical Downlink Control Channel (PDCCH) (also, referred to as 'DL L1/L2 control channel') for transmitting control information provided by the first and second layers such as a DL/UL Scheduling Grant, and the like. As for uplink physical channels for transmitting information transferred via the channels used in uplink transmission over a radio interface between the network and the terminal, there is a Physical Uplink Shared Channel (PUSCH) for transmitting uplink SCH information, a Physical Random Access Channel (PRACH) for transmitting RACH information, and a Physical Uplink Control Channel (PUCCH) for transmitting control information provided by the first and second layers, such as a HARQ ACK or NACK, a Scheduling Request (SR), a Channel Quality Indicator (CQI) report, and the like.

Description of a procedure for an initial access to a network by a terminal in a related art LTE system will be given.

First, a terminal (UE) selects an available random access signature and a random access occasion by using system information transmitted from a base station (eNB) via an RRC signal, and then transmits a random access preamble (hereinafter, referred to as a 'message 1') to the base station. Upon successfully receiving the random access preamble from the terminal, the base station transmits a random access response (a 'message 2') to the terminal. Then, the terminal, having received the random access response, transmits an RRC Connection Request message (a 'message 3') according to information related to radio resource allocation included in the random access response. Finally, after receiving the RRC Connection Request message from the terminal, the base station transmits an RRC Contention Resolution message (a 'message 4') to the terminal.

DISCLOSURE OF INVENTION

Technical Solution

As described above, in the related art random access procedure, the terminal transmits the message 3 to the base station, and starts a contention resolution timer. If the terminal cannot receive its own cell identifier or an upper level identifier included in the message 4 before the contention resolution timer is expired, the terminal would re-attempt to perform the random access procedure. However, in the related art, the terminal should wait for the expiration of the contention resolution timer in order to re-attempt the random access.

Therefore, an object of the present invention is to provide a method for re-attempting a random access immediately when a terminal detects an error during a random access procedure.

To achieve this and other advantages and in accordance with the purpose of the present invention, as embodied and broadly described herein, there is provided a method of transmitting an uplink data in a wireless communication system, the method including: transmitting a first random access preamble; receiving a random access response in response to the first random access preamble, wherein the random access response including a radio resource allocation information; transmitting the uplink data to a network using the radio resource allocation information and starting a contention resolution timer, wherein the uplink data is transmitted using a HARQ (Hybrid Automatic Repeat request); retransmitting the uplink data if a positive acknowledgment corresponding to the HARQ transmission is not received from the network; determining whether or not a number of the uplink data transmissions equals to a maximum number of HARQ transmissions; and transmitting a second random access preamble to the network before the contention resolution timer is expired, if the number of the uplink data transmissions is determined to be equal to or larger than the maximum number of HARQ transmissions.

To achieve this and other advantages and in accordance with the purpose of the present invention, as embodied and broadly described herein, there is also provided a method of transmitting an uplink data in wireless communication system, the method comprising: transmitting a first random access preamble; receiving a random access response in response to the first random access preamble, wherein the random access response including radio resource allocation information; transmitting the uplink data to a network using the radio resource allocation information and starting a contention resolution timer, wherein the uplink data is transmitted using a HARQ (Hybrid Automatic Repeat request); retransmitting the uplink data if a positive acknowledgment corresponding to the HARQ transmission is not received from the network; determining whether or not a number of the uplink data transmissions equals to a maximum number of HARQ transmissions; and stopping the contention resolution timer and transmitting a second random access preamble to the network if the number of the uplink data transmissions is determined to be equal to or larger than the maximum number of HARQ transmissions.

To achieve this and other advantages and in accordance with the purpose of the present invention, as embodied and broadly described herein, there is also provided a mobile terminal for transmitting an uplink data in a wireless communications system, the mobile terminal comprising: a transceiver adapted to transmit or receive the uplink data; a memory adapted to store the uplink data transmitted or received via the transceiver or from an external source; and a processor cooperating with the transceiver and the memory and adapted to perform the steps of, transmitting a first random access preamble; receiving a random access response in response to the first random access preamble, wherein the random access response including uplink grant information; transmitting uplink data to a network using the uplink grant information and starting a contention resolution timer, wherein the uplink data is transmitted using a HARQ (Hybrid Automatic Repeat request); retransmitting the uplink data if a positive acknowledgment corresponding to the HARQ transmission is not received from the network; determining whether or not a number of the uplink data transmissions equals to a maximum number of HARQ transmissions; and stopping the contention resolution timer and transmitting a second random access preamble to the network if the number of the uplink data transmissions is determined to be equal to or larger than the maximum number of HARQ transmissions.

MODE FOR THE INVENTION

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

Hereinafter, description of structures and operations of the preferred embodiments according to the present invention will be given with reference to the accompanying drawings.

In general, a terminal (or UE) may perform a random access procedure in the following cases: 1) when the terminal performs an initial access because there is no RRC Connection with a base station (or eNB), 2) when the terminal initially accesses to a target cell in a handover procedure, 3) when it is requested by a command of a base station, 4) when there is uplink data transmission in a situation where uplink time synchronization is not aligned or where a specific radio resource used for requesting radio resources is not allocated, and 5) when a recovery procedure is performed in case of a radio link failure or a handover failure.

In the LTE system, the base station allocates a dedicated random access preamble to a specific terminal, and the terminal performs a non-contention random access procedure which performs a random access procedure with the random access preamble. In other words, there are two procedures in selecting the random access preamble: one is a contention based random access procedure in which the terminal randomly selects one within a specific group for use, another is a non-contention based random access procedure in which the terminal uses a random access preamble allocated only to a specific terminal by the base station. The difference between the two random access procedures is that whether or not a collision problem due to contention occurs, as described later. And, the non-contention based random access procedure may be used, as described above, only in the handover procedure or when it is requested by the command of the base station.

Figure 1:
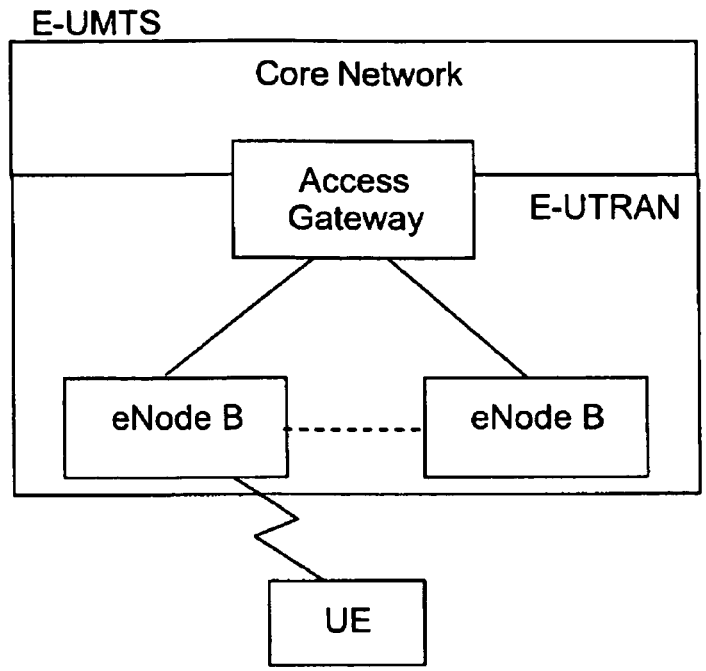
FIG. 1 shows an exemplary network structure of an Evolved Universal Mobile Telecommunications System (E-UMTS) as a mobile communication system to which a related art and the present invention are applied.
Figure 2:
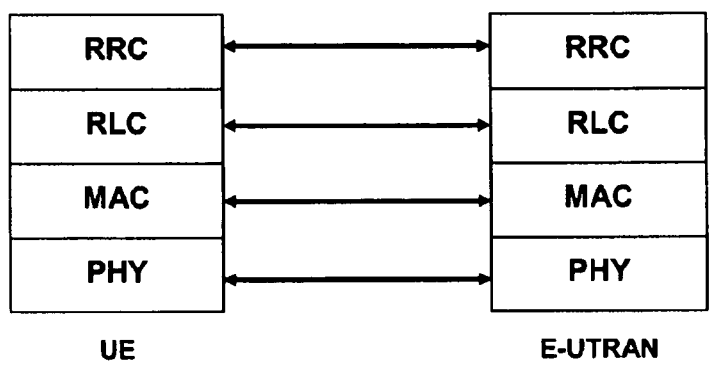
FIG. 2 shows an exemplary view of related art control plane architecture of a radio interface protocol between a terminal and an E-UTRAN.
Figure 3:
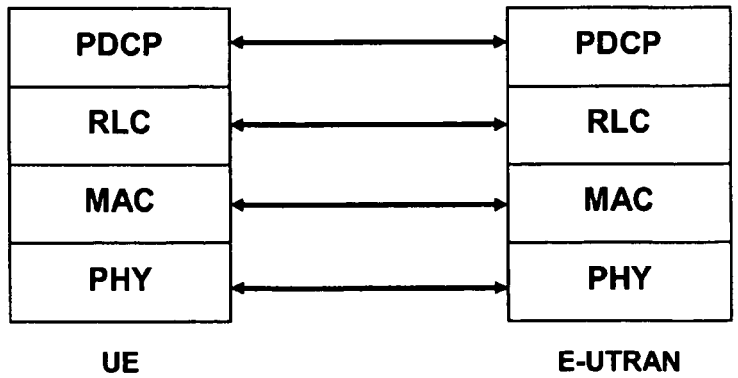
FIG. 3 shows an exemplary view of related art user plane architecture of a radio interface protocol between a terminal and an E-UTRAN.
Figure 4:
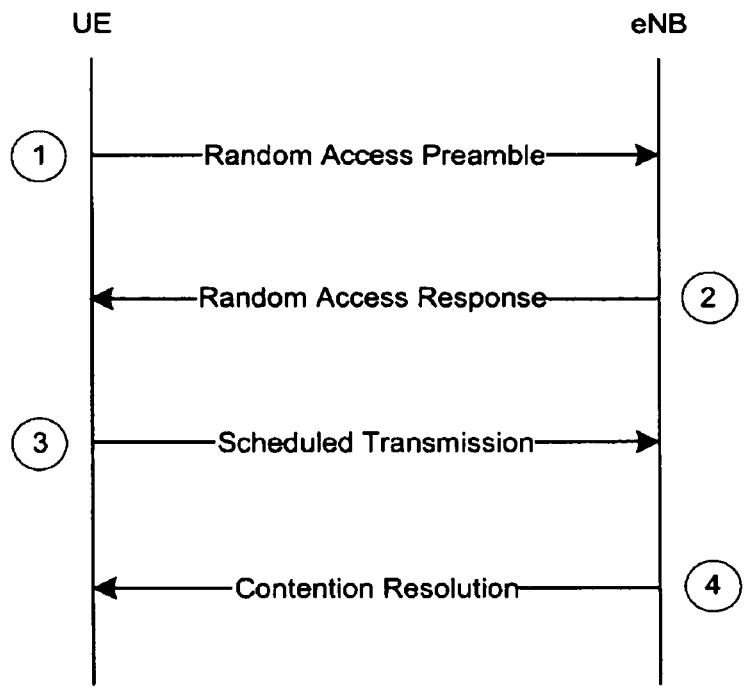
FIG. 4 shows an exemplary view of a contention based random access procedure.

Based on the above description, FIG. 4 shows an operation procedure between a terminal and a base station in a contention based random access procedure.

First, a terminal in the contention based random access randomly may select a random access preamble within a group of random access preambles indicated through system information or a handover command, may select PRACH resources capable of transmitting the random access preamble, and then may transmit the selected random access preamble to a base station (Step 1).

After transmitting the random access preamble, the terminal may attempt to receive a response with respect to its random access preamble within a random access response reception window indicated through the system information or the handover command (Step 2). More specifically, the random access response information is transmitted in a form of MAC PDU, and the MAC PDU may be transferred on the Physical Downlink Shared Channel (PDSCH). In addition, the Physical Downlink Control Channel (PDCCH) is also transferred such that the terminal appropriately receives information transferred on the PDSCH. That is, the PDCCH may include information about a terminal that should receive the PDSCH, frequency and time information of radio resources of the PDSCH, a transfer format of the PDSCH, and the like. Here, if the PDCCH has been successfully received, the terminal may appropriately receive the random access response transmitted on the PDSCH according to information of the PDCCH. The random access response may include a random access preamble identifier (ID), an UL Grant, a temporary C-RNTI, a Time Alignment Command, and the like. Here, the random access preamble identifier is included in the random access response in order to notify terminals to which information such as the UL Grant, the temporary C-RNTI, and the Time Alignment Command would be valid (available, effective) because one random access response may include random access response information for one or more terminals. Here, the random access preamble identifier may be identical to the random access preamble selected by the terminal in Step 1.

If the terminal has received the random access response valid to the terminal itself, the terminal may process each of the information included in the random access response. That is, the terminal applies the Time Alignment Command, and stores the temporary C-RNTI. In addition, the terminal uses the UL Grant so as to transmit data stored in a buffer of the terminal or newly generated data to the base station (Step 3). Here, a terminal identifier should be essentially included in the data which is included in the UL Grant (message 3). This is because, in the contention based random access procedure, the base station may not determine which terminals are performing the random access procedure, but later the terminals should be identified for contention resolution. Here, two different schemes may be provided to include the terminal identifier. A first scheme is to transmit the terminal's cell identifier through the UL Grant if the terminal has already received a valid cell identifier allocated in a corresponding cell prior to the random access procedure. Conversely, the second scheme is to transmit the terminal's unique identifier (e.g., S-TMSI or random ID) if the terminal has not received a valid cell identifier prior to the random access procedure. In general, the unique identifier is longer than the cell identifier. In Step 3, if the terminal has transmitted data through the UL Grant, the terminal starts the contention resolution timer.

After transmitting the data with its identifier through the UL Grant included in the random access response, the terminal waits for an indication (instruction) of the base station for the contention resolution. That is, the terminal attempts to receive the PDCCH so as to receive a specific message (Step 4). Here, there are two schemes to receive the PDCCH. As described above, if the terminal identifier transmitted via the UL Grant is the cell identifier, the terminal attempts to receive the PDCCH by using its own cell identifier. If the terminal identifier transmitted via the UL Grant is its unique identifier, the terminal attempts to receive the PDCCH by using the temporary C-RNTI included in the random access response. Thereafter, for the former, if the PDCCH (message 4) is received through its cell identifier before the contention resolution timer is expired, the terminal determines that the random access procedure has been successfully (normally) performed, thus to complete the random access procedure. For the latter, if the PDCCH is received through the temporary cell identifier before the contention resolution timer is expired, the terminal checks data (message 4) transferred by the PDSCH that the PDCCH indicates. If the unique identifier of the terminal is included in the data, the terminal determines that the random access procedure has been successfully (normally) performed, thus to complete the random access procedure.

Figure 5:
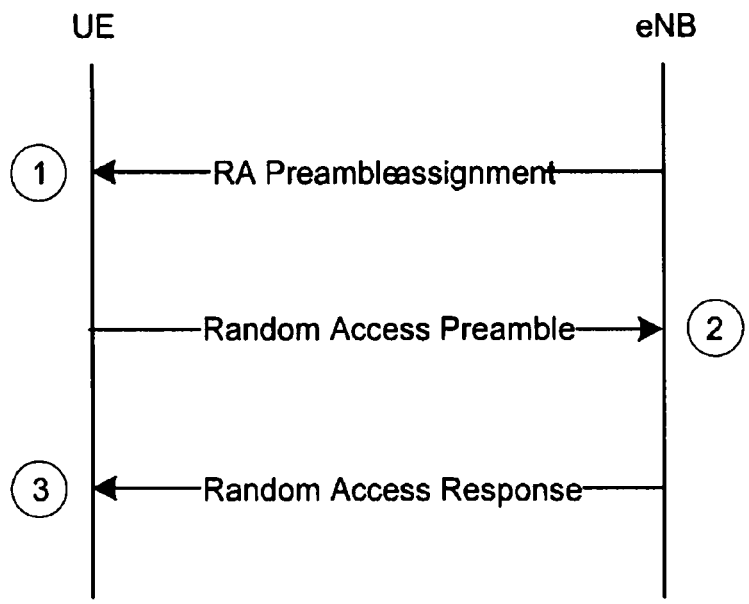
FIG. 5 shows an exemplary view of a non-contention based random access procedure.

FIG. 5 shows an operation procedure between a terminal and a base station in a non-contention based random access procedure. As compared with the contention based random access procedure, the random access procedure is determined to be successfully performed by receiving the random access response information in the non-contention based random access procedure, thus to complete the random access process.

In general, the non-contention based random access procedure may be performed in the following two cases: one is the handover procedure, and the other is a request by the command of the base station. To be certain, the contention based random access procedure may also be performed in those two cases. First, for the non-contention based random access procedure, it is important to receive, from the base station, a dedicated random access preamble without having any possibility of contention. Here, a handover command and a PDCCH command may be used to assign the random access preamble. Then, after the random access preamble dedicated to only the terminal itself has been assigned from the base station, the terminal transmits the preamble to the base station. Thereafter, the method for receiving the random access response information is the same as that in the above-described contention based random access procedure.

The contention resolution scheme in the random access procedure will be described in more detail. First, contention occurring during the random access procedure is due to the limited number of the random access preambles. That is, since the base station cannot assign unique random access preambles to all terminals, the terminal should randomly select one among common random access preambles for transmission. Accordingly, there are cases in which two or more terminals would select and transmit the same random access preamble through the same PRACH resource. However, the base station would determine it as one random access preamble transmitted from one terminal. Therefore, the base station would transmit a positive random access response (acknowledgement) for the random access preamble to the terminals. However, since the contention has occurred, two or more terminals would receive the one random access response, thereby causing the terminals to perform different operations. In other words, the terminals transmit different data on the same radio resources by using the UL Grant included in the random access response. Accordingly, the data transmission may all fail, or data of a certain terminal may only be received by the base station according to positions or transmission power of the terminals. For the latter, since the two or more terminals assume that their data transmission has been successfully completed, the base station should notify the corresponding terminals of the contention failure. That is, notification of information related to the contention failure or success is referred to as the 'contention resolution.'

Here, there are two methods for the contention resolution. One is to use the contention resolution timer, and the other is to transmit an identifier of a terminal having succeeded in contention. The former is used when the terminal already has the unique cell identifier (C-RNTI) prior to the random access procedure. That is, the terminal having the cell identifier transmits data including its cell identifier to the base station according to the random access response, and starts the contention resolution timer. And, if PDCCH information having the cell identifier therein is received before the contention resolution timer is expired, the terminal determines that it has succeeded in contention, thus to complete the random access procedure in a normal manner. Conversely, if the PDCCH information having the cell identifier therein is not received before the contention resolution timer is expired, the terminal determines that it has failed in contention, thus either to re-attempt the random access procedure or to notify such failure to an upper layer. The latter among the contention resolutions, i.e., transmitting the identifier of the terminal having succeeded is used when the terminal does not have a unique cell identifier prior to the random access procedure. If the terminal does not have its cell identifier, the terminal includes for transmission an upper identifier (S-TMSI or random ID) higher than the cell identifier according to the UL Grant information included in the random access response, and then operates (activates) the contention resolution timer. Before the contention resolution timer is expired, if data including its upper identifier is transmitted on the DL-SCH, the terminal would determine that the random access procedure has succeeded. On the other hand, before the contention resolution timer is expired, if data including its upper identifier is not transmitted on the DL-SCH, the terminal would determine that the random access procedure has failed.

The terminal in the random access procedure transmits the message 3 to the base station, and starts the contention resolution timer. If the message 4 including the cell identifier of the terminal or the upper identifier is not received before the contention resolution timer is expired, the terminal would re-attempt to perform the random access procedure. However, the message 3 is transmitted in a Hybrid Automatic Repeat and reQuest (HARQ) manner, and the terminal has already been informed of a maximum number of message 3 HARQ retransmissions before performing the random access procedure. Accordingly, when the terminal is to transmit the message 3, if the terminal attempted to transmit up to the maximum number of HARQ retransmissions but has not received the HARQ ACK (acknowledgement), the terminal may immediately determine that an error has occurred during the random access procedure.

Figure 6:
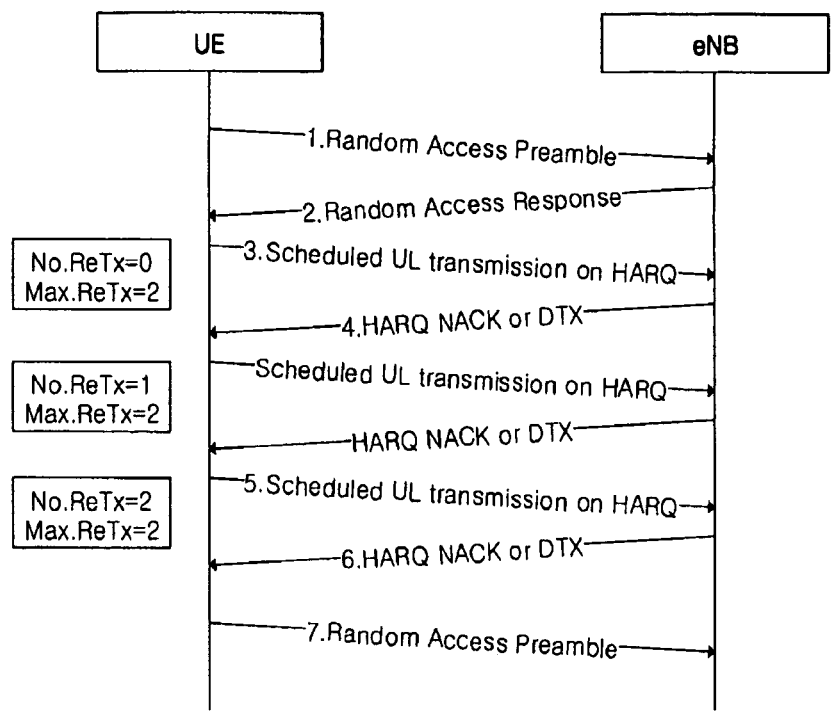
FIG. 6 shows an exemplary view of a procedure for re-attempting a random access according to the present invention.

FIG. 6 shows an exemplary view of a procedure for re-attempting a random access between a terminal and a base station according to the present invention. That is, the terminal determines transmission error of the message 3, and re-attempts the random access.

First, the terminal transmits a random access preamble to the base station. Upon receiving the random access preamble from the terminal, the base station transmits a random access response including UL Grant information to the terminal. The terminal receives the random access response, and transmits data to the base station by using the UL Grant information included the response, and then starts a contention resolution timer. Thereafter, if the base station has not successfully received the data, an HARQ NACK (Negative ACKnowledgment) is transmitted to the terminal. If the terminal has received the HARQ NACK, the terminal increments (increases) a variant CURRENT_TX_NB, by 1, serving to manage the number of HARQ retransmissions in the MAC layer of the terminal, and re-transmits the data to the base station.

Then, if the CURRENT_TX_NB of the terminal is equal to or greater than the maximum number of message 3 HARQ retransmissions, and if the HARQ ACK for the retransmission has not received from the base station (i.e., HARQ NACK or HARQ DTX), the terminal determines that the random access procedure has failed. If the random access procedure is determined to be failed, the terminal may immediately re-attempt the random access procedure, if needed. In more detail, if the terminal has determined that the random access procedure has failed, the terminal may re-attempt the random access procedure even before the contention resolution timer expires. In addition, if the random access procedure is re-attempted or if the random access procedure has determined to be failed as above described, the terminal may stop the contention resolution timer.

The present invention provides a method for re-attempting a random access procedure, by the terminal, even before the contention resolution timer expires, when transmitting the message 3 in the random access procedure, if the terminal has not Received the HARQ ACK even though the maximum number of HARQ retransmissions has been reached.

It can be said that the present disclosure may provides a method of transmitting an uplink data in wireless communication system, the method comprising: transmitting a first random access preamble; receiving a random access response in response to the first random access preamble, wherein the random access response including a radio resource allocation information; transmitting the uplink data to a network using the radio resource allocation information and starting a contention resolution timer, wherein the uplink data is transmitted using a HARQ (Hybrid Automatic Repeat request); retransmitting the uplink data if a positive acknowledgment corresponding to the HARQ transmission is not received from the network; determining whether or not a number of the uplink data transmissions equals to a maximum number of HARQ transmissions; and transmitting a second random access preamble to the network before the contention resolution timer is expired, if the number of the uplink data transmissions is determined to be equal to or larger than the maximum number of HARQ transmissions, wherein the first and second random access preambles are equal to each other, the first and second random access preambles are used in a contention based random access procedure, the random access response is received in a form of MAC PDU (Medium Access Control Protocol Data Unit), the MAC PDU is received on a PDSCH (Physical Downlink Shared Channel), the random access response further includes at least one of a random access preamble identifier (ID), a temporary C-RNTI, and time alignment command, and the radio resource allocation information is uplink grant information.

Also, the present disclosure may provide a method of transmitting an uplink data in wireless communication system, the method comprising: transmitting a first random access preamble; receiving a random access response in response to the first random access preamble, wherein the random access response including radio resource allocation information; transmitting the uplink data to a network using the radio resource allocation information and starting a contention resolution timer, wherein the uplink data is transmitted using a HARQ (Hybrid Automatic Repeat request); retransmitting the uplink data if a positive acknowledgment corresponding to the HARQ transmission is not received from the network; determining whether or not a number of the uplink data transmissions equals to a maximum number of HARQ transmissions; and stopping the contention resolution timer and transmitting a second random access preamble to the network if the number of the uplink data transmissions is determined to be equal to or larger than the maximum number of HARQ transmissions, wherein the random access response is received on a PDSCH (Physical Downlink Shared Channel) in a form of MAC PDU (Medium Access Control Protocol Data Unit), the random access response further includes at least one of a random access preamble identifier (ID), a temporary C-RNTI, and time alignment command information, and the radio resource allocation information is uplink grant information.

It can be also said that the present disclosure may provide a mobile terminal for transmitting an uplink data in a wireless communications system, the mobile terminal comprising: a transceiver adapted to transmit or receive the uplink data; a memory adapted to store the uplink data transmitted or received via the transceiver or from an external source; and a processor cooperating with the transceiver and the memory and adapted to perform the steps of, transmitting a first random access preamble; receiving a random access response in response to the first random access preamble, wherein the random access response including uplink grant information; transmitting uplink data to a network using the uplink grant information and starting a contention resolution timer, wherein the uplink data is transmitted using a HARQ (Hybrid Automatic Repeat request); retransmitting the uplink data if a positive acknowledgment corresponding to the HARQ transmission is not received from the network; determining whether or not a number of the uplink data transmissions equals to a maximum number of HARQ transmissions; and stopping the contention resolution timer and transmitting a second random access preamble to the network if the number of the uplink data transmissions is determined to be equal to or larger than the maximum number of HARQ transmissions.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage media (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of transmitting uplink data in a wireless communication system, the method comprising:
    transmitting a first random access preamble;
    receiving a random access response in response to the first random access preamble, the received random access response including radio resource allocation information;
    transmitting the uplink data using the radio resource allocation information and starting a contention resolution timer, the uplink data transmitted using Hybrid Automatic Repeat Request (HARQ);
    re-transmitting the uplink data when a positive acknowledgment corresponding to the uplink data transmission is not received;
    determining whether a number of uplink data transmissions is equal to or greater than a maximum number of HARQ transmissions; and
    transmitting a second random access preamble before the contention resolution timer expires when the number of uplink data transmissions is equal to or greater than the maximum number of HARQ transmissions.

2. The method of claim 1, wherein the first and second random access preambles are the same.

3. The method of claim 1, wherein the first and second random access preambles are used in a contention-based random access procedure.

4. The method of claim 1, wherein the received random access response is in a form of a Medium Access Control Protocol Data Unit (MAC PDU).

5. The method of claim 4, wherein the MAC PDU is received via a Physical Downlink Shared Channel (PDSCH).

6. The method of claim 1, wherein the received random access response further includes at least a random access preamble identifier (ID), a temporary Cell Radio Network Temporary Identifier (C-RNTI) or time alignment command information.

7. The method of claim 1, wherein the radio resource allocation information comprises uplink grant information.

8. A method of transmitting uplink data in a wireless communication system, the method comprising:
    transmitting a first random access preamble;
    receiving a random access response in response to the first random access preamble, the received random access response including radio resource allocation information;
    transmitting the uplink data using the radio resource allocation information and starting a contention resolution timer, the uplink data transmitted using Hybrid Automatic Repeat Request (HARQ);
    re-transmitting the uplink data when a positive acknowledgment corresponding to the uplink data transmission is not received;
    determining whether a number of uplink data transmissions is equal to or greater than a maximum number of HARQ transmissions; and
    stopping the contention resolution timer and transmitting a second random access preamble when the number of uplink data transmissions is equal to or greater than the maximum number of HARQ transmissions.

9. The method of claim 8, wherein the random access response is received via a Physical Downlink Shared Channel (PDSCH) and in a form of a Medium Access Control Protocol Data Unit (MAC PDU).

10. The method of claim 8, wherein the received random access response further includes at least a random access preamble identifier (ID), a temporary Cell Radio Network Temporary Identifier (C-RNTI) or time alignment command information.

11. The method of claim 8, wherein the radio resource allocation information comprises uplink grant information.

12. A mobile terminal for transmitting uplink data in a wireless communications system, the mobile terminal comprising:
    a transceiver adapted to transmit or receive the uplink data;
    a memory adapted to store uplink data transmitted or received via the transceiver or received from an external source; and
    a processor adapted to:
    transmit a first random access preamble,
    receive a random access response in response to the first random access preamble, the received random access response including uplink grant information,
    transmit uplink data using the uplink grant information and start a contention resolution timer, the uplink data transmitted using Hybrid Automatic Repeat Request (HARQ),
    re-transmit the uplink data when a positive acknowledgment corresponding to the uplink data transmission is not received,
    determine whether a number of uplink data transmissions is equal to or greater than a maximum number of HARQ transmissions, and
    stop the contention resolution timer and transmit a second random access preamble when the number of uplink data transmissions is equal to or greater than the maximum number of HARQ transmissions.

* * * * *